US012641034B2

(12) United States Patent
Dong et al.

(10) Patent No.: US 12,641,034 B2
(45) Date of Patent: May 26, 2026

(54) END-TO-END LATENCY GUARANTEE FOR DOWNLINK TRAFFIC

(71) Applicant: Huawei Technologies Co., Ltd., Guangdong (CN)

(72) Inventors: Lijun Dong, Santa Clara, CA (US); Lin Han, Santa Clara, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 234 days.

(21) Appl. No.: 18/534,275

(22) Filed: Dec. 8, 2023

(65) Prior Publication Data

US 2024/0113987 A1 Apr. 4, 2024

Related U.S. Application Data

(63) Continuation of application No. PCT/US2021/070998, filed on Jul. 27, 2021.

(51) Int. Cl.
| | |
|---|---|
| *H04L 47/6295* | (2022.01) |
| *H04L 41/5006* | (2022.01) |
| *H04W 28/20* | (2009.01) |

(52) U.S. Cl.
CPC ...... *H04L 47/6295* (2013.01); *H04L 41/5006* (2013.01); *H04W 28/20* (2013.01)

(58) Field of Classification Search
CPC . H04L 47/6295; H04L 41/5006; H04W 28/20
See application file for complete search history.

(56) References Cited

U.S. PATENT DOCUMENTS

| | | | | |
|---|---|---|---|---|
| 2019/0313359 A1* | 10/2019 | Lee | ......................... | H04W 4/40 |
| 2020/0267088 A1* | 8/2020 | Navrátil | .................. | H04L 43/16 |
| 2021/0029655 A1* | 1/2021 | Lindoff | ............. | H04W 56/0045 |
| 2021/0211942 A1* | 7/2021 | Guo | ......................... | H04L 41/40 |
| 2021/0274508 A1* | 9/2021 | Tanaka | .................. | H04W 28/24 |
| 2022/0070718 A1* | 3/2022 | Luo | ......................... | H04W 76/12 |

FOREIGN PATENT DOCUMENTS

| | | |
|---|---|---|
| WO | 2020150333 A1 | 7/2020 |
| WO | 2021067130 A1 | 4/2021 |

* cited by examiner

*Primary Examiner* — Madhu Woolcock
(74) *Attorney, Agent, or Firm* — Conley Rose, P.C.

(57) ABSTRACT

A method and a network device for achieving end-to-end latency guarantees, where the method includes: receiving, by a network device in a core network, a latency guarantee service (LGS) request message from a source node in a data network (DN), the LGS request message requesting to transmit traffic to an end device and comprising one or more of a LGS indicator, an end-to-end packet delay budget (PDB) requirement, a maximum flow rate, and an end device identifier; determining a remaining PDB for the core network and a transport network; sending an LGS slice selection request to a network function, including one or more of the remaining PDB, the maximum flow rate, and the identifier; and receiving an LGS response from the network function, which identifies an LGS slice for the requested traffic and indicates whether the LGS slice is able to satisfy the remaining PDB and the maximum flow rate.

16 Claims, 6 Drawing Sheets

500

START

502 — RECEIVE REQUEST MESSAGE FROM SOURCE NODE IN DN

504 — DETERMINE REMAINING PDB BASED ON REQUEST MESSAGE

506 — SEND LGS SELECTION REQUEST TO NETWORK FUNCTION

508 — RECEIVE RESPONSE MESSAGE FROM NETWORK FUNCTION

END

END-TO-END LATENCY GUARANTEE FOR DOWNLINK TRAFFIC

CROSS-REFERENCE TO RELATED APPLICATIONS

This application is a continuation of International Application No. PCT/US2021/070998, filed on Jul. 27, 2021, by Futurewei Technologies, Inc., and titled "End-to-End Latency Guarantee for Downlink Traffic," which is incorporated herein in its entirety.

TECHNICAL FIELD

The present disclosure relates to downlink traffic, and more particularly, to providing end-to-end latency guarantees for downlink traffic in data communication networks.

BACKGROUND

The role of internet is switching from traditional applications in text, voice, and video with greater tolerance on delay and loss to more demand for autonomous machine-based services that do not tolerate either delay or loss. Such services may be categorized as high precision communications (HPC) configured to provide guarantees with high accuracy. While traditional network services generally allow a certain degree of aggregated tolerance on degradation of key performance metrics (e.g., packet loss, end-to-end delay, network throughput, etc.), HPC services require stricter guarantees of such key performance metrics. Latency performance is an example of one such metric, and is defined as the time that elapses from when a packet is sent by a sender (i.e., beginning with the first bit of the packet), until the packet is fully received (i.e., including the last bit of the packet) by a receiver across the network.

Latency guaranteed service (LGS) is a service that ensures delivery of packets within a bounded latency requirement. As an example, for an "in-time" service, LGS may ensure that the maximum end-to-end (E2E) latency is below a given upper limit (e.g., such that packets are delivered with a required latency that is not to be exceeded). As another example, for an "on-time" service, LGS may ensure that the maximum E2E latency and jitter is below a given upper limit (e.g., such that packets are delivered within a specified time window). While internet technology has significantly evolved since inception of the Internet, current technologies generally do not provide hard guarantees about performance such as end-to-end LGS for downlink or uplink dataflows.

SUMMARY

A first aspect relates to a method for achieving end-to-end latency guarantees, where the method includes: receiving, by a network device in a core network, a latency guarantee service (LGS) request message from a source node in a data network (DN), where the LGS request message requests to transmit traffic to an end device, and where the LGS request message comprises an end-to-end packet delay budget (PDB) requirement, a maximum flow rate, and an identifier of the end device; determining, by the network device based on the LGS request message, a remaining PDB for the core network and a transport network; sending, by the network device based on the LGS indicator, an LGS slice selection request to a network function, where the LGS slice selection request includes the remaining PDB, the maximum flow rate, and the identifier; and receiving, by the network device, an LGS response from the network function, where the LGS response identifies an LGS slice for the requested traffic.

Optionally, in any of the preceding aspects, another implementation of the aspect provides that determining the remaining PDB requirement includes one or more of: extracting metadata embedded in the request message, where the metadata comprises information regarding the remaining PDB, and where the network device determines the remaining PDB based on the metadata; and subtracting a PDB of the DN from the end-to-end PDB requirement to obtain the remaining PDB for the core network.

Optionally, in any of the preceding aspects, another implementation of the aspect provides that the network device comprises a user plane function (UPF) entity, where the core network comprises a $5^{th}$ generation (5G) core (5GC) network, and where the network function comprises an access and mobility management function (AMF) or a network slice selection function (NSSF).

Optionally, in any of the preceding aspects, another implementation of the aspect provides that the method further includes reserving, by the network device, resources in the LGS slice when the LGS response comprises network slice selection assistance information (NSSAI), where the reception of the NSSAI indicates that the LGS slice is able to satisfy the remaining PDB and the maximum flow rate; and sending, by the network device, a response message to the source node based on the NSSAI, where the response message indicates that the request to transmit traffic is accepted.

Optionally, in any of the preceding aspects, another implementation of the aspect provides that the method further includes conducting, by the network device when a session for the end device has been previously established, a service request procedure immediately after sending the response message when the end device is in a connection management (CM)-IDLE state or a CM-CONNECTED state.

Optionally, in any of the preceding aspects, another implementation of the aspect provides that the LGS request message further comprises an LGS indicator, where the LGS indicator indicates that the source node requests an LGS for a downlink dataflow from the source node to the end device, where the end-to-end PDB requirement denotes a total PDB of a $5^{th}$ generation (5G) radio access network (5G-RAN), transport network, and the core network, where the maximum flow rate comprises a maximum bit rate (MBR) of the downlink dataflow, and where the identifier of the end device comprises a default Internet Protocol (IP) address associated with a protocol data unit (PDU) session that the end device establishes towards the DN.

Optionally, in any of the preceding aspects, another implementation of the aspect provides that the LGS response comprises a suggested end-to-end PDB when the LGS slice is not able to satisfy the remaining PDB and the maximum flow rate, where the suggested end-to-end PDB indicates a maximum end-to-end latency characteristic associated with the LGS slice.

Optionally, in any of the preceding aspects, another implementation of the aspect provides that the LGS slice is limited to a latency guarantee service, where only flows destined to end devices or initiated by end devices subscribing to the LGS are admissible to the latency guarantee service, and where all flows admitted in the latency guarantee service do not compete with one another for resources.

A second aspect relates to a network device for achieving end-to-end latency guarantees. The network device includes a storage device and a processor coupled to the storage device. The processor is configured to execute instructions stored on the storage device such that when executed, cause the network device to: receive a latency guarantee service (LGS) request message from a source node in a data network (DN), where the LGS request message requests to transmit traffic to an end device, and where the LGS request message comprises an end-to-end packet delay budget (PDB) requirement, a maximum flow rate, and an identifier of the end device; determine, based on the LGS request message, a remaining PDB for a transport network and a core network, where the network device is disposed in the core network; send, based on the LGS indicator, a LGS slice selection request to a network function, where the LGS slice selection request includes the remaining PDB, the maximum flow rate, and the identifier; and receive an LGS response from the network function, where the LGS response identifies an LGS slice for the requested traffic.

Optionally, in any of the preceding aspects, another implementation of the aspect provides that the network device determines the remaining PDB by one or more of: extracting metadata embedded in the LGS request message, where the metadata comprises information regarding the remaining PDB, and where the network device determines the remaining PDB based on the metadata; and subtracting a PDB of the DN from the end-to-end PDB requirement to obtain the remaining PDB for the core network.

Optionally, in any of the preceding aspects, another implementation of the aspect provides that the network device comprises a user plane function (UPF) entity, where the core network comprises a $5^{th}$ generation (5G) core (5GC) network, and where the network function comprises an access and mobility management function (AMF) or a network slice selection function (NSSF).

Optionally, in any of the preceding aspects, another implementation of the aspect provides that the processor is configured to execute the instructions to further cause the network device to: reserve resources in the LGS slice when the when the LGS response comprises network slice selection assistance information (NSSAI), where reception of the NSSAI indicates that the LGS slice is able to satisfy the remaining PDB and the maximum flow rate; and send a response message to the source node based on the NSSAI, where the response message indicates that the request to transmit traffic is accepted.

Optionally, in any of the preceding aspects, another implementation of the aspect provides that the processor is configured to execute the instructions to further cause the network device to conduct, when a session for the end device has been previously established, a service request procedure immediately after sending the response message when the end device is in a connection management (CM)-IDLE state or a CM-CONNECTED state.

Optionally, in any of the preceding aspects, another implementation of the aspect provides that LGS request message further comprises an LGS indicator, where the LGS indicator indicates that the source node requests an LGS for a downlink dataflow from the source node to the end device, where the end-to-end PDB requirement denotes a total PDB of a $5^{th}$ generation (5G) radio access network (5G-RAN), the transport network, and the core network, where the maximum flow rate comprises a maximum bit rate (MBR) of the downlink dataflow, and where the identifier of the end device comprises a default Internet Protocol (IP) address associated with a protocol data unit (PDU) session that the end device establishes towards the DN.

Optionally, in any of the preceding aspects, another implementation of the aspect provides that the LGS response comprises a suggested end-to-end PDB when the NSSAI indicates that the LGS slice is not able to satisfy the remaining PDB and the maximum flow rate, where the suggested end-to-end PDB indicates a maximum end-to-end latency characteristic associated with the LGS slice.

Optionally, in any of the preceding aspects, another implementation of the aspect provides that the LGS slice is limited to a latency guarantee service, where only flows destined to end devices or initiated by end devices subscribing to the LGS are admissible to the latency guarantee service, and where all flows admitted in the latency guarantee service do not compete with one another for resources.

A third aspect relates to a network device for achieving end-to-end latency guarantees. The network device includes: means for means for receiving a latency guarantee service (LGS) request message from a source node in a data network (DN), where the LGS request message requests to transmit traffic to an end device, and where the LGS request message comprises an end-to-end packet delay budget (PDB) requirement, a maximum flow rate, and an identifier of the end device; means for determining, based on the LGS request message, a remaining PDB for a core network and a transport network, where the network device is disposed in the core network; means for sending, based on the LGS request message, an LGS slice selection request to a network function, where the LGS slice selection request includes the remaining PDB, the maximum flow rate, and the identifier; and means for receiving an LGS response from the network function, where the LGS response identifies an LGS slice for the requested traffic.

Optionally, in any of the preceding aspects, another implementation of the aspect provides that the means for determining the remaining PDB comprises one or more of: means for extracting metadata embedded the LGS request message, where the metadata comprises information regarding the remaining PDB, and where the network device determines the remaining PDB based on the metadata; and means for subtracting a PDB of the DN from the end-to-end PDB requirement to obtain the remaining PDB for the core network.

Optionally, in any of the preceding aspects, another implementation of the aspect provides that the network device comprises a user plane function (UPF) entity, where the core network comprises a $5^{th}$ generation (5G) core (5GC) network, and where the network function comprises an access and mobility management function (AMF) or a network slice selection function (NSSF).

Optionally, in any of the preceding aspects, another implementation of the aspect provides that the network device further includes: means for reserving resources in the LGS slice when the when the LGS response comprises network slice selection assistance information (NSSAI), where reception of the NSSAI indicates that the LGS slice is able to satisfy the remaining PDB and the maximum flow rate; and means for sending a response message to the source node based on the NSSAI, where the response message indicates that the request to transmit traffic is accepted.

Optionally, in any of the preceding aspects, another implementation of the aspect provides that the network device further includes means for conducting, when a session for the end device has been previously established, a service request procedure immediately after sending the response message when the end device is in a connection management (CM)-IDLE state or a CM-CONNECTED state.

Optionally, in any of the preceding aspects, another implementation of the aspect provides that the LGS request message further comprises an LGS indicator, where the LGS indicator indicates that the source node requests an LGS for a downlink dataflow from the source node to the end device, where the end-to-end PDB requirement denotes a total PDB of a $5^{th}$ generation (5G) radio access network (5G-RAN), the transport network, and the core network, where the maximum flow rate comprises a maximum bit rate (MBR) of the downlink dataflow, and where the identifier of the end device comprises a default Internet Protocol (IP) address associated with a protocol data unit (PDU) session that the end device establishes towards the DN.

Optionally, in any of the preceding aspects, another implementation of the aspect provides that the LGS response comprises a suggested end-to-end PDB when the LGS slice is not able to satisfy the remaining PDB and the maximum flow rate, where the suggested end-to-end PDB indicates a maximum end-to-end latency characteristic associated with the LGS slice.

A fourth aspect relates to a source node in a data network (DN). The source node includes: a storage device configured to store instructions; and a processor coupled to the storage device. The processor is configured to execute the instructions to cause the source node to: send a latency guarantee service (LGS) request message to a network device in a core network, where the LGS request message requests to transmit traffic to an end device, and where the LGS request message comprises an end-to-end packet delay budget (PDB) requirement, a maximum flow rate, and an identifier of the end device; receive a response message from the network device, where the response message indicates whether the request to transmit traffic is accepted; and initiate a downlink flow to transmit the requested traffic to the UE when the response message indicates that the request to transmit traffic is accepted.

Optionally, in any of the preceding aspects, another implementation of the aspect provides that the source node sends a second LGS request message to the network device when the source node receives a second response message indicating that the request to transmit traffic is rejected, where the second LGS request message comprises a new end-to-end PDB requirement, and where the source node obtains the new end-to-end PDB requirement by adjusting the end-to-end PDB requirement based on a suggested end-to-end PDB in the second response message.

Optionally, in any of the preceding aspects, another implementation of the aspect provides that the response message comprises information for identifying the downlink flow when the response message indicates that the request to transmit traffic is accepted.

Optionally, in any of the preceding aspects, another implementation of the aspect provides that the processor is configured to execute the instructions to further cause the source node to send the LGS request message to cause a network device to perform the steps of any of the preceding aspects.

Among other things, the disclosed techniques enable message flows to achieve end-to-end latency guaranteed service for downlink traffic initiated from a data network to an end device such as a wireless terminal.

For the purpose of clarity, any one of the foregoing implementation forms may be combined with any one or more of the other foregoing implementations to create a new embodiment within the scope of the present disclosure. These embodiments and other features will be more clearly understood from the following detailed description taken in conjunction with the accompanying drawings and claims.

DETAILED DESCRIPTION

The technical solutions in the embodiments of this application may be applied to a $5^{th}$ generation (5G) system, New Radio (NR) system, a future communications network, or the like. Additionally, a network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may learn that as network architectures evolve and new service scenarios emerge, the technical solutions provided in the embodiments of this application are also applicable to similar technical problems.

Network Architecture

Figure 1:
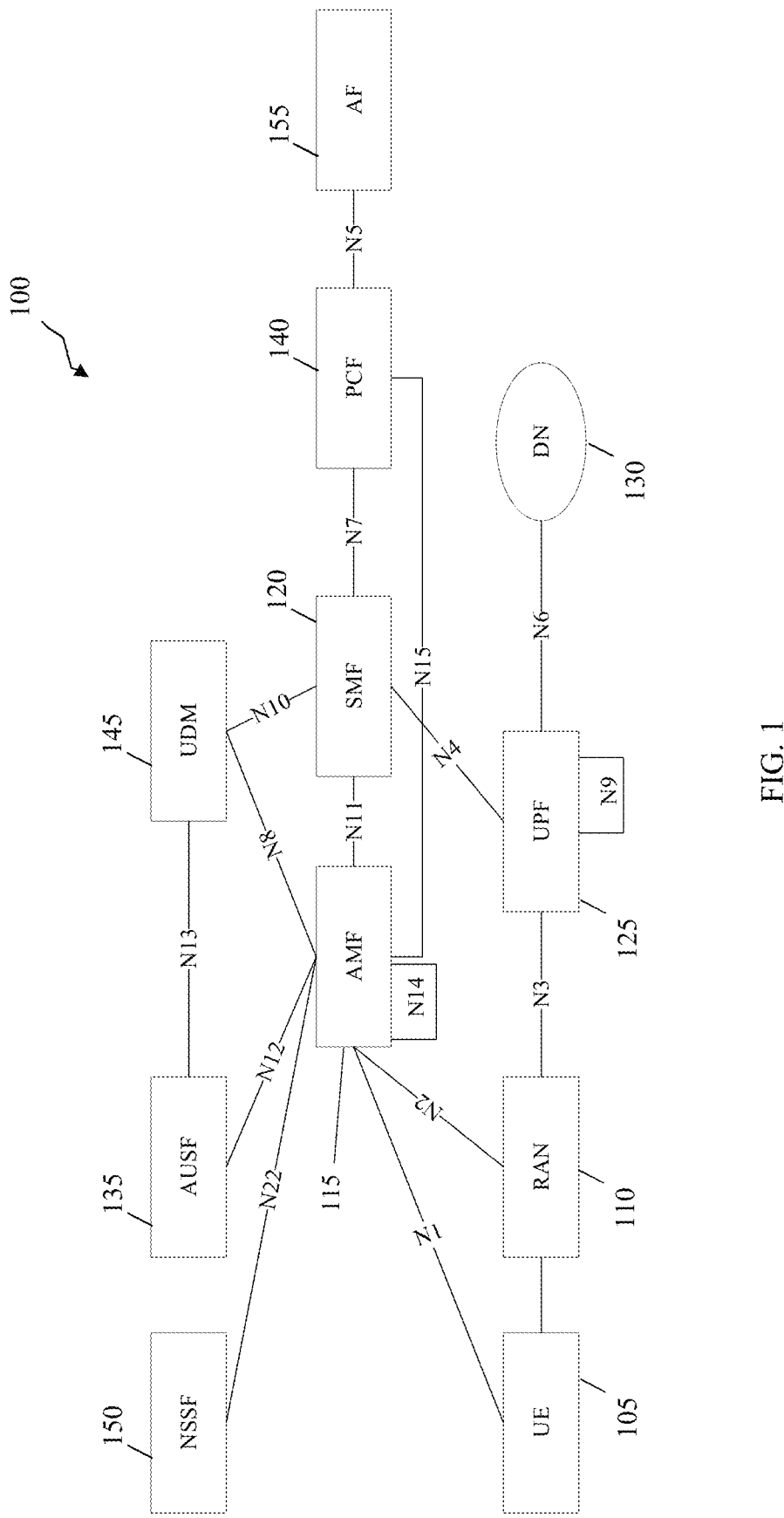
FIG. 1 is a diagram of a network architecture according to an embodiment of the disclosure.

FIG. 1 is a diagram of a network architecture 100 according to an embodiment of the disclosure. The following separately describes, with reference to FIG. 1, network elements that may be in the network architecture.

User equipment (UE) 105: the UE 105 may be referred to as a terminal device, a terminal, an access terminal, a subscriber unit, a subscriber station, a mobile station, a mobile console, a remote station, a remote terminal, a mobile device, a user terminal, a wireless communications device, a user agent, or a user apparatus. In some aspects, the UE 105 may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future network, a terminal device in a future evolved public land mobile network (PLMN), or the like. Additionally, the UE 105 may be an end device, a logical entity, an intelligent device, a terminal device such as a mobile phone or an intelligent terminal, a communications device such as a server, a gateway, a base station, a controller, or an internet of things (IoT) device (e.g., as a sensor, an electricity meter, or a water meter), or the UE 105 may be an unmanned aerial vehicle (UAV) having a communication function. This is not limited in the embodiments of this application.

Radio access network (RAN) 110: The RAN 110 is an access network (AN) that may implement a network access function based on a wireless communications technology. The RAN 110 provides a network access function for an authorized user in a specific area, and can use transmission tunnels of different quality based on user levels, service requirements, and the like. The RAN 110 may use different access technologies. Current radio access technologies include a $3^{rd}$ Generation Partnership Project (3GPP) access technology (e.g., a radio access technology used in a $3^{rd}$ generation (3G), $4^{th}$ generation (4G), or 5G system) and a non-3rd generation partnership project (non-3GPP) access technology. The 3GPP access technology is an access technology that complies with a 3GPP standard specification. An access network using the 3GPP access technology may be referred to as a radio access network. An access network device in a 5G system (or other future system) may be referred to as a next generation node base station (gNB). The non-3GPP access technology is an access technology that does not comply with the 3GPP standard specification, e.g., an air interface technology represented by an access point (AP) in a Wi-Fi system.

The RAN 110 can manage a radio resource, provide an access service for a terminal (e.g., UE 105), and complete forwarding of a control signal and user data between the terminal and a core network. Additionally, the RAN 110 may comprise, for example, a NodeB, an evolved NodeB (eNB or eNodeB), a gNB in a 5G mobile communications system, a base station in a future mobile communications system, or an AP in a Wi-Fi system, or may be a radio controller in a cloud radio access network (CRAN) scenario. Alternatively, the RAN 110 may comprise an access network device such as a relay station, an access point, a vehicle-mounted device, a wearable device, a network device in a future network, a network device in a future evolved PLMN, or the like. A specific technology and a specific device form that are used by a radio access network device are not limited in the embodiments of this application.

Access and mobility management function (AMF) entity 115: the AMF entity 115 is mainly used for mobility management, access management, and the like, and may be configured to implement a function, for example, a lawful interception function or an access authorization (or authentication) function, other than session management in functions of a mobility management entity (MME).

Session management function (SMF) entity 120: the SMF entity 120 is mainly configured to manage a session, allocate and manage an Internet Protocol (IP) address of the UE 105, select a manageable user plane function, serve as a termination point of a policy control or charging function interface, notify downlink data, and so forth.

User plane function (UPF) entity 125: the UPF entity 125 is a data plane gateway, and may be used for packet routing, packet forwarding, packet inspection, packet monitoring, quality of service (QoS) processing of user plane data, or the like. User data may access a data network via the UPF entity 125. In embodiments of this application, the UPF entity 125 may be configured to implement a function of a user plane gateway.

Data network (DN) 130: the DN 130 is a network configured to provide service data, for example, an operator service network, the internet, or a third-party service network. The DN 130 may include various application servers that provide services. In some aspects, the SMF entity 120 may buffer user plane traffic or forward user plane traffic towards the DN 130 or the UE 105 via the UPF entity 125.

Authentication server function (AUSF) entity 135: the AUSF entity 135 is mainly configured to authenticate a user and so forth.

Policy control function (PCF) entity 140: the PCF 140 entity is a unified policy framework configured to provide guidance on network behavior, and provides policy and rule information and the like for control plane function network elements (e.g., the AMF and SMF network elements).

Unified data management (UDM) entity 145: the UDM entity 145 is configured to perform user identity processing, access authentication, registration, mobility management, and the like.

Network slice selection function (NSSF) entity 150: the NSSF entity 150 selects an appropriate network slice or network slice instance (NSI) for the UE 105. An NSI is an instantiated network created by the operator on an infrastructure based on a network slice template, and is generated by combining different network function entities and physical resources. Different network slice instances are logically isolated from each other. One or more NSIs may be obtained through instantiation of one network slice, and each NSI may be identified by a network slice instance identifier (NSI ID).

Application function (AF) entity 155: the AF entity 155 is configured to influence data routing, access a network exposure function (NEF) network element (not shown), interact with a policy framework to perform policy control, and the like. For example, the AF entity 155 may be a vehicle-to-everything (V2X) application server, including a V2X application enabler (VAE) server, or may be a drone server (which may include a drone supervision server or a drone application service server).

In the network architecture 100 shown in FIG. 1, the network elements may communicate with each other based on a point-to-point interface. Such interfaces are summarized below.

An N1 interface is a reference point between the UE 105 and the AMF entity 115, and may be used for non-access stratum (NAS) signaling management and transmission.

An N2 interface is a reference point between the RAN 110 and the AMF entity 115, and is configured for signaling transmission.

An N3 interface is a reference point between the RAN 110 and the UPF entity 125, and is configured to transmit user plane data or the like.

An N4 interface is a reference point between the SMF entity 120 and the UPF entity 125, and is configured to transmit information such as tunnel identifier information of an N3 connection, data buffer indication information, and a downlink data notification message. In the 5GC domain, the N4 interface may serve as a bridge between the control plane and the user plane. As such, the N4 interface may act as a conduit for protocol data unit (PDU) session management and traffic steering towards the UPF entity 125, as well as PDU usage and event reporting towards the SMF entity 120. The SMF entity 120 may convey policy rules obtained from the PCF entity 140 regarding packet handling, forwarding, and usage reporting to the UPF entity 125. In order for the UPF entity 125 to recognize user plane traffic to be governed by a particular rule, the UPF entity 125 may use packet flow descriptions (PFDs) provided by a network element such as the SMF entity 120.

An N5 interface is a reference point for interactions between the PCF entity 140 and the AF entity 155.

An N6 interface is a reference point between the UPF entity 125 and the DN 130, and is configured to transmit the user plane data and the like.

An N7 interface is a reference point between the SMF entity 120 and the PCF entity 140, and is configured to work out and deliver policy control and charging information.

An N8 interface is a reference point between the AMF entity 115 and the UDM entity 145, and is configured to obtain mobility-related subscription information of a user and the like.

An N10 interface is a reference point between the SMF entity 120 and the UDM entity 145, and is configured to obtain session management-related subscription information of a user and the like.

An N11 interface is a reference point between the AMF entity 115 and the SMF entity 120, and is configured to transmit session management information and the like.

An N12 interface is a reference point between the AMF entity 115 and the AUSF entity 135.

An N13 interface is a reference point between the AUSF entity 135 and the UDM entity 145.

An N15 interface is a reference point between the AMF entity 115 and the PCF entity 140, and is configured to obtain access and mobility-related policy information.

An N22 interface is a reference point between the AMF entity 115 and the NSSF entity 150.

While only one UPF entity 125 is shown in FIG. 1, multiple UPF entities may be employed in other implementations (e.g., an intermediate UPF and an anchor UPF). In such implementations, any two UPF entities may communicate with each other through an N9 interface. Similarly, only one AMF entity 115 is shown in FIG. 1, but multiple AMF entities may be employed in other implementations. In such implementations, any two AMF entities may communicate with each other through an N14 interface.

It should be understood that the network architecture 100 shown in FIG. 1 may be applied to the embodiments of this application. In addition, a network architecture applicable to the embodiments of this application is not limited thereto. Any network architecture that can implement functions of the foregoing network elements is applicable to the embodiments of this application.

It should be further understood that entities such as the AMF entity 115, the SMF entity 120, the UPF entity 125, the AUSF entity 135, the PCF entity 140, and the UDM entity 145 shown in FIG. 1 may be understood as network elements that are in a core network and that are configured to implement different functions. Additionally, one or more such entities may be combined into a network slice as desired or required. The core network elements may be independent devices, or may be integrated into a same device to implement different functions. This is not limited in this application. It should be noted that the term "network element" may also be referred to as an entity, a device, an apparatus, a module, or the like. This is not limited in this application.

It should be further understood that the foregoing names are merely used to distinguish between different functions, and do not mean that the network elements are independent physical devices. Forms of the foregoing network elements are not limited in this application. For example, the network elements may be integrated into a same physical device, or may be different physical devices. In addition, the foregoing names are merely for ease of distinguishing between the different functions, and shall not constitute any limitation on this application. This application does not exclude a possibility of using another name in the 5G network and another future network. For example, in a 6th generation (6G) network or beyond, some or all of the foregoing network elements may use a term in 5G, or may use another name. A unified description is provided herein, and details are not described below again.

Similarly, names of interfaces between the network elements in FIG. 1 are merely an example. During implementation, the names of the interfaces may be other names. This is not specifically limited in this application. In addition, names of messages (or signaling) transmitted between the foregoing network elements are merely an example, and do not constitute any limitation on functions of the messages.

Network Slicing

Figures 2A, 2B:
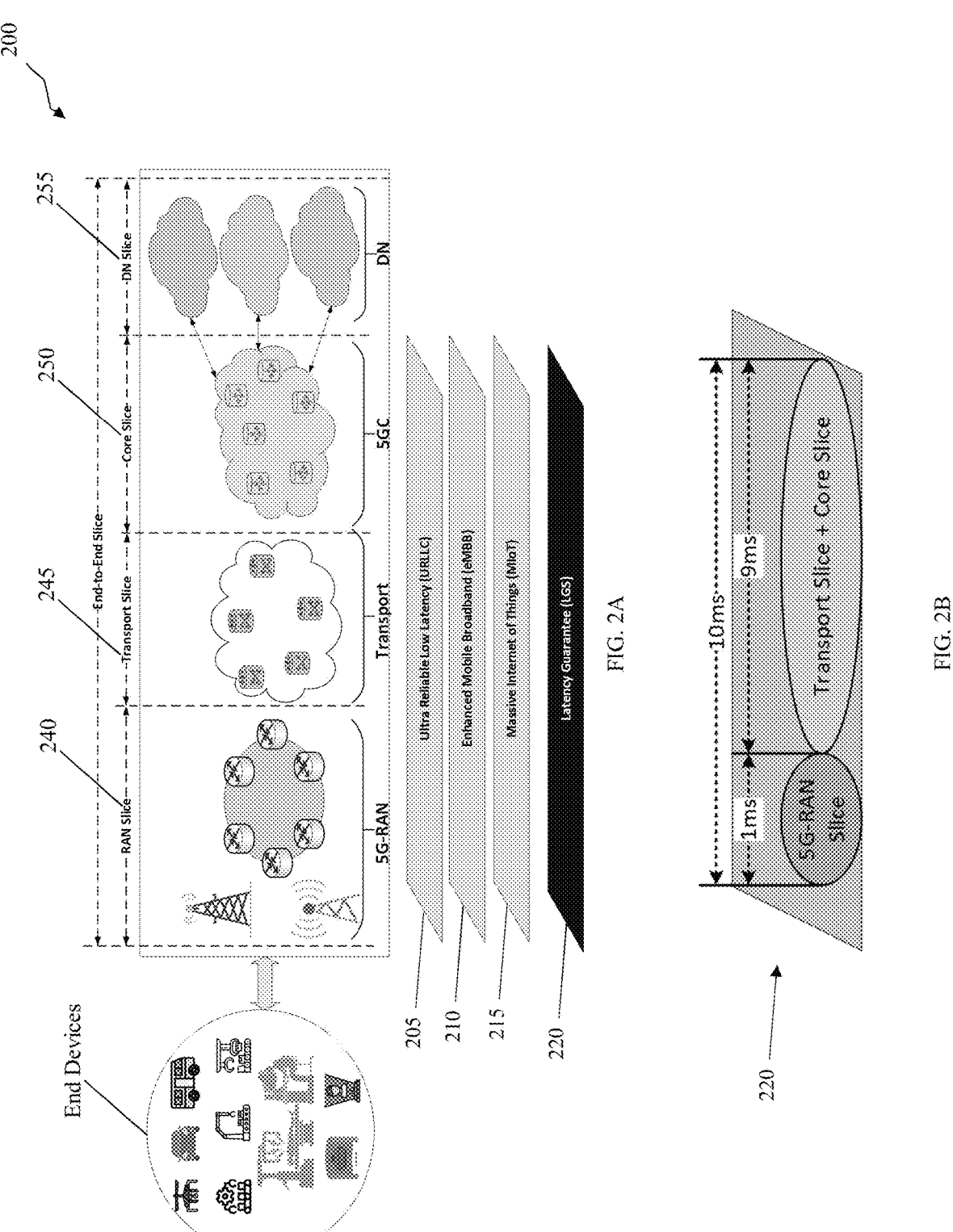
FIG. 2A is a diagram of an end-to-end slice architecture according to an embodiment of the disclosure.
FIG. 2B is an example diagram of an LGS slice depicted in FIG. 2A.

FIG. 2A is an example diagram of an end-to-end slice architecture 200 according to an embodiment of the disclosure. A concept of a network slice (NS) has been introduced in 5G networks to satisfy different requirements of different communications services for network performance. For example, using a 5G network technology, resources and functions of an actual network may be divided to form different network slices to satisfy different requirements, thereby reducing network operation investment costs, and enriching network operation modes.

Network slicing addresses issues of a conventional "one-size-fits-all" design, which generally lack flexibility, scalability, and isolation. Network slicing is the collection of a set of technologies to create specialized, dedicated logical networks as a service. By slicing a physical network into logical networks, each logical network can provide customized services for a distinct business purpose. A 5G network slice is a self-contained and logically isolated network, such that over the same network infrastructure, diversified applications can be accommodated simultaneously with their service requirements being met without any affect from other slices.

A network slice may be categorized as one of several types. In 5G systems, for example, the following types of slices have been standardized: an ultra-reliable low latency (URLLC) slice 205, which supports low-latency transmissions of small payloads with very high reliability; an enhanced mobile broadband (eMBB) slice 210, which provides substantially high bandwidth to applications and supports stable connections with high peak data rates for augmented reality, tele-presence applications, and communications in high mobility environments (e.g., in drones, high-speed trains, aircrafts, etc.); and a massive internet of things (mIoT) slice 215, which can support a relatively large quantity of IoT devices that typically are only intermittently awake and send small data payloads. In some aspects, the mIoT slice 215 may additionally or alternatively be referred to as a massive machine type communication (mMTC) slice.

As a stringent latency guarantee becomes one of the more important network services demanded by many use cases in 5G applications, as well as those emerging (e.g., holographic type communications, Internet Protocol (IP) mobile backhaul transport for 5G/B5G (beyond 5G) communications, industrial automation, remote surgery, etc.), a new slice type, namely an LGS slice 220, is defined to provide stringent latency guarantee service. An LGS type slice 220 is associated with the maximum latency that can be incurred between end devices (e.g., the UE 105 and the UPF entity 125 that terminates the N6 interface in FIG. 1), which corresponds to a 5G quality of service (QoS) characteristic known as a packet delay budget (PDB).

As shown in FIGS. 2A and 2B, an LGS type slice 220 in 5G involves a 5G-RAN slice 240, a Transport slice 245, and a 5G Core (5GC) slice 250. The end-to-end slice architecture 200 also includes a DN slice 255, which is discussed later. The latency generated in the LGS slice 220 is the combination of the latency incurred in the 5G-RAN slice 240, Transport slice 245, and 5GC slice 250. The appropriate 5G-RAN slice 240, Transport slice 245, and 5GC slice 250 are chosen for constructing an LGS slice 220, with the sum of their corresponding PDB values equal to or smaller than the PDB requirement of the LGS slice 220. An application in an end device could select one of the available LGS slice instances, whose end-to-end PDB is small enough to satisfy the application's stringent end-to-end latency requirement.

LGS Latency Requirement

Currently, the PDB requirement of a 5G-RAN slice 240 is defined in 3GPP specifications. Therefore, for discussion purposes, assume there exists a predetermined or pre-guaranteed latency within the 5G-RAN slice 240. As shown in FIG. 2B, for example, the latency within the 5G-RAN slice 240 may be 1 millisecond (ms), and an end-to-end latency requirement for a given application may be 10 ms. As such, one can conclude that the PDB within the Transport and Core slice domains is equal to 9 ms.

In order to achieve stringent latency guarantee in the LGS slice 220, the total maximum latency incurred in the Transport Slice 245 and Core Slice 250 needs to satisfy the following constraint:

$$PDB_{TP+5GC} = E2EPDB_{requested} - PDB_{DN} - PDB_{5G\text{-}RAN} \tag{1}$$

where $PDB_{TP+5GC}$ denotes the PDB within the Transport slice 245 and 5G-Core slice 250, $E2EPDB_{requested}$ denotes the end-to-end latency budget between the time when a source node sends a packet and the time the packet reaches a destination node, $PDB_{DN}$ denotes the PDB within the DN slice 255, and $PDB_{5G\text{-}RAN}$ denotes the PDB within the 5G-RAN slice 240. In other words, the total maximum latency incurred in the Transport Slice 245 and the Core Slice 250 will be the end-to-end latency budget, less the PDBs within the DN slice 255 and the 5G-RAN slice 240.

For discussion purposes, other delays (e.g., congestion, propagation, switching, look-up, etc.) are assumed to be fixed and thus excluded from the latency calculations described herein for convenience (but would be added to the delay, subtracted from the PDB, or otherwise accounted for in actual implementations). The maximum latency incurred in a router i in the Transport slice 245 and Core slice 250 of an LGS may be calculated using the following equations:

$$D_{max}^i = \frac{N_{max}^i * L_{max}}{R_{egress}} \tag{2}$$

$$N_{max}^i = \lceil 2(R_{in}^i / R_{egress}) + 1 \rceil \tag{3}$$

$$R_{in}^i = \sum_{k=1}^{K} MBR_k^i \tag{4}$$

where $$R_{in}^i$$

denotes the total maximum bit rate (MBR) of already admitted flows in the LGS, $R_{egress}$ denotes the egress rate of the router i, $$N_{max}^i$$

denotes the total number of packets that have accumulated in a queue before a packet from that queue is transmitted, $L_{max}$ denotes the maximum packet size in terms of bits, and $$D_{max}^i$$

is calculated as the total maximum size of packets divided by the egress rate ($R_{egress}$) of the router i.

In some implementations, $$N_{max}^i$$

may be calculated in a coarser manner using the following equation:

$$N_{max}^i = \lceil 2(R_{ingress} / R_{egress}) + 1 \rceil \tag{5}$$

where $R_{ingress}$ denotes the maximum ingress rate of the router i.

The maximum latency $D_{max}$ incurred in the Transport slice 245 and Core slice 250 of the LGS slice 220 may be expressed as the sum of latencies incurred in each router in the Transport slice 245 and Core slice 250. Thus, $D_{max}$ can be derived using the following equation:

$$D_{max} = \sum_{i=1}^{R} D_{max}^i \tag{6}$$

In an embodiment, the PDB of the Transport slice 245 and Core slice 250 may be deemed satisfied when the following condition is met: $PDB_{TP+5GC} \geq D_{max}$.

LGS Slice Selection

An LGS slice can only accommodate a flow with a maximum bit rate (MBR) and an end-to-end PDB requirement ($E2EPDB_{requested}$) when certain conditions are met. For example, in an LGS slice, for an intermediate router with an ingress rate denoted as $R_{ingress}$ and an egress rate denoted as $R_{egress}$, the MBR needs to satisfy the following conditions:

$$MBR \leq R_{ingress} - \sum_{i=1}^{n} MBR_i^{LGS} \qquad \text{Condition 1}$$

$$MBR \leq R_{egress} - \sum_{i=1}^{n} MBR_i^{LGS} \qquad \text{Condition 2}$$

where $$\sum_{i=1}^{n} MBR_i^{LGS}$$

denotes the total MBR of n number of flows already admitted in the LGS slice. In other words, Condition 1 is satisfied when the MBR is less than or equal to the difference between the ingress rate $R_{ingress}$ of an intermediate router and the total MBR of n flows admitted in the LGS slice. Similarly, Condition 2 is satisfied when the MBR is less than or equal to the difference between the egress rate $R_{egress}$ of an intermediate router and the total MBR of n flows admitted in the LGS slice.

5G QoS Overview

In a network architecture such as in FIG. 1, a UE 105 may establish a protocol data unit (PDU) session to a DN 130 in which all communication with the DN 130 may take place. A service data flow (SDF) is end-to-end packet flow for applications, where each SDF can be associated with a 5G QoS flow. Sometimes multiple SDFs may be grouped together in a 5G QoS flow, in which case each SDF may share the same parameters. A 5G QoS flow is known to provide granular enforcement of QoS in a 5G network. Each 5G QoS flow may be defined by a QoS profile, which identifies the 5G QoS characteristics with a 5G QoS Identifier (5QI) and Allocation and Retention Priority (ARP) parameters. Although 5G QoS characteristics define the packet forwarding treatment that a given QoS flow receives edge-to-edge between a UE 105 and UPF 125 (e.g., scheduling preference, admission strategy, queue management, etc.), the QoS flow cannot guarantee end-to-end latency beyond the UPF 125, e.g., with the other end being in the Internet.

Current 3GPP 5G specifications define how a network element (e.g., gNB) maps a 5G QoS flow to a specific data radio bearer (DRB) on a radio interface, and they also specify the maximum latency incurred in a 5G RAN. However, such specifications lack details as to how a transport network and core network in a 5G domain can accommodate the end-to-end latency guarantee requirement for flows.

Disclosed herein are embodiments for achieving end-to-end latency guarantee for traffic flows initiated in the DN 130 (e.g., the Internet) and destined to an end device (e.g., UE 105). Such traffic flows are first admitted by an LGS slice through a request-to-send and LGS slice instance selection, which is followed by a service request procedure and PDU session establishment/activation within the selected LGS slice. Additionally, the LGS slice may be limited to a latency guarantee service, thereby ensuring that only flows destined to UEs or initiated by UEs subscribing to the LGS are admissible to the latency guarantee service. In some cases, flows destined to UEs may be initiated by the UEs (e.g., a downlink flow to a UE may be initiated in response to a request from the UE). In other cases, flows destined to UEs may be initiated by a network entity (e.g., a source node may initiate a flow to a UE upon the source node receiving data intended for the UE). Further, all flows admitted in the selected LGS slice do not compete with one another for resources. Thus, all admitted flows have a same priority as one another and are treated without discrimination within the scope of the selected LGS slice. These and other features are detailed further below.

Request to Send

Figure 3A:
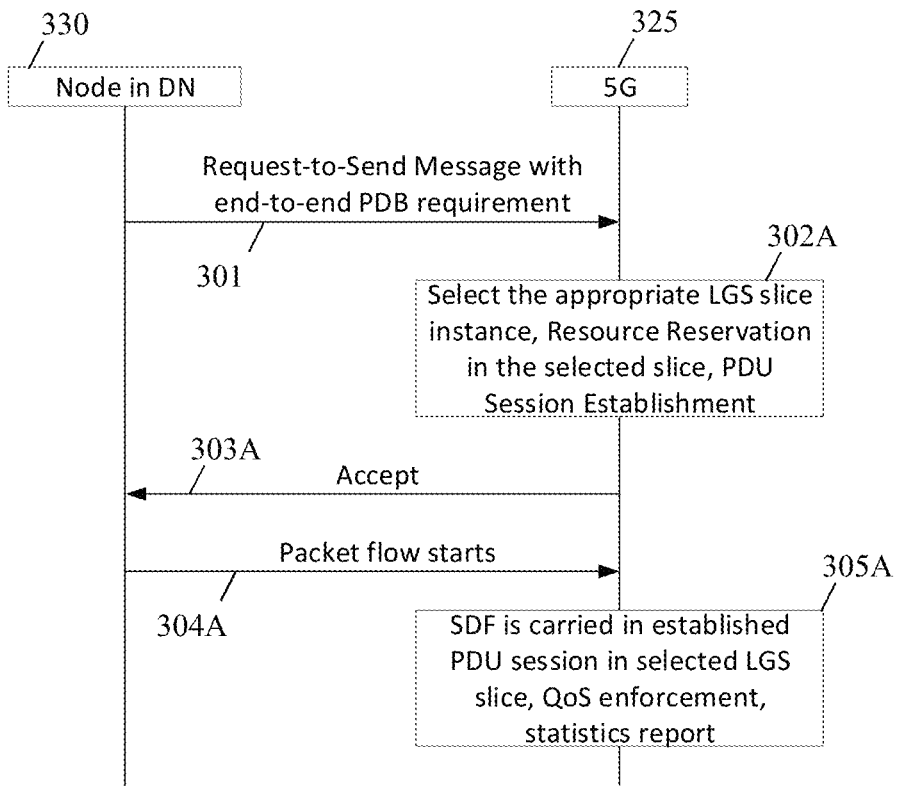
FIGS. 3A and 3B are diagrams of Request-to-Send procedures according to an embodiment of the disclosure.
Figure 3B:
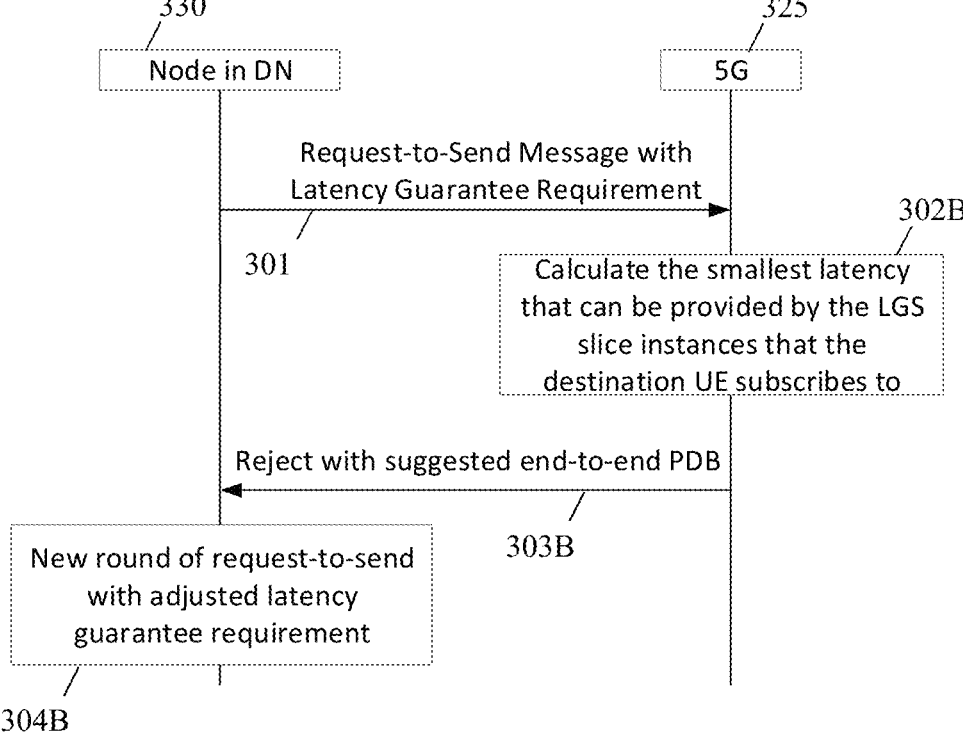

FIGS. 3A and 3B are diagrams of Request-to-Send procedures according to an embodiment of the disclosure. More particularly, FIG. 3A depicts a high-level procedure for downlink latency guarantee traffic when a Request-to-Send is accepted, and FIG. 3B depicts a high-level procedure for downlink latency guarantee traffic when the Request-to-Send is rejected. It should be understood that although FIGS. 3A and 3B are described with respect to downlink transmissions, the concepts described herein are similarly applicable to uplink transmissions (e.g., traffic from a UE 105 to a network-side entity such as a server).

When a source node 330 in the DN 130 has downlink traffic intended for an end device (e.g., UE 105), the source node 330 may initiate a procedure to send such downlink traffic. This procedure may be triggered by either the source node 330 or the end device. For example, the end device may subscribe to a certain service, in which case the source node 330 may initiate the procedure upon the arrival of new subscriber data. In some cases, the end device may be configured to receive downlink information at fixed intervals or a certain time.

At step 301, a source node 330 (e.g., a server) in the DN 130 may initiate a downlink flow by sending a Request-to-Send message to a network element (e.g., UPF entity 125) in the 5G domain 325. In an embodiment, the Request-to-Send message may contain one or more of a latency guarantee service indicator, an end-to-end PDB requirement, a maximum flow rate (e.g., MBR), and a default destination address. The latency guarantee service indicator indicates that the source node 330 in the DN 130 requests latency guaranteed service for a data transmission towards the end device (e.g., UE 105). The end-to-end PDB requirement may comprise an $E2EPDB_{requested}$ parameter, which denotes an end-to-end latency budget between the time when the source node 330 sends the packet and when the packet reaches the end device. The maximum flow rate denotes the highest flow rate that the source node 330 will generate towards the end device. The default destination address may comprise the end device's default IP address that is associated with a default PDU session that the end device establishes towards the DN 130.

When the Request-to-Send message is routed through the DN 130 (e.g., the Internet), the $E2EPDB_{requested}$ parameter is updated by subtracting PDB DN from the $E2EPDB_{requested}$ parameter each time latency is incurred at a hop (e.g., router) between the source node 330 and the 5G domain 325. Therefore, when the Request-to-Send message reaches the 5G domain 325, the $E2EPDB_{requested}$ parameter denotes the total PDB of the 5GC, the Transport network, and the 5G-RAN domain ($PDB_{TP+5GC}+PDB_{5GRAN}$), which is referred to as $5GPDB_{requested}$ in the present disclosure. The PDB can also be updated in other ways, such as by recording an accumulated latency at each hop and then updating the PDB based on the accumulated latency, comparing a time of sending the packet by the source node 330 with a time of reception in the 5G domain 325, or other techniques. Thus, the device in the 5G domain 325 can determine the total PDB of the 5GC based on the Request-to-Send message.

In the 5G domain 325, the decision on whether the Request-to-Send message is accepted or rejected will be made based on the $5GPDB_{requested}$ parameter. When there exists an LGS slice instance that the end device subscribes to and that can guarantee a latency smaller than the $5GPDB_{requested}$, the entity in the 5G domain 325 may accept the Request-to-Send, as shown in step 302A of FIG. 3A. Otherwise, the entity in the 5G domain 325 may reject the Request-to-Send, as shown in step 303B of FIG. 3B. In the following discussion we will assume that the entity in the 5G domain is a UPF entity 125, and that the end device to which downlink traffic is intended is a UE 105, although other options are possible.

When the Request-to-Send is accepted, the UPF entity 125 selects an appropriate LGS slice instance and reserves an appropriate resource in the selected slice, such as shown in block 302A. In an embodiment, the appropriate resource may comprise one or more intermediate routers between the source node 330 and the end device, where resources may be reserved such that an available ingress rate and an available egress rate of each intermediate router are managed to yield a pre-determined upper bound of latency capable of being generated in the selected LGS slice.

In step 303A, the UPF 125 entity may return an accept message to the source node 330. An accept message may also optionally be sent to the UE (not shown). Then, as shown in step 304A of FIG. 3A, a packet flow from the DN 130 and towards the UE 105 may start. The packet flow may comprise a new PDU session established between the UE 105 and the source node 330 in the selected LGS slice instance, or an existing PDU session within the selected LGS slice instance may be activated. The upcoming packet flow (e.g., SDF) is associated with the QoS of latency guarantee, with the PDB characteristic being set equal to the $5GPDB_{requested}$.

As shown in block 305A, the entity in the 5G domain 325 may be configured or provided with various parameters/information to perform one or more functions associated with the placket flow. For example, such functions may include QoS enforcement, traffic statistics (e.g., congestion, usage, etc.) reporting, flow classification, packet monitoring, packet routing, packet forwarding, application detection, bandwidth enforcement, or the like. In some aspects, the entity in the 5G domain 325 may perform such functions based on parameters/information received from another network element (e.g., SMF entity 120) over a reference point such as the N4 interface (in FIG. 1), which may employ the packet forwarding control protocol (PFCP). PFCP sessions established with the entity in the 5G domain may define how packets are identified (e.g., based on packet detection rules), forwarded (e.g., based on forwarding action rules), processed (e.g., based on buffering action rules), marked (e.g., based on QoS enforcement rules), reported (e.g., based on usage reporting rules), and the like.

When the UPF entity 125 in the 5G domain 325 determines that there is no UE-subscribed LGS slice instance available that can satisfy the $5GPDB_{requested}$, the UPF entity 125 may reject the Request-to-Send. However, the UPF entity 125 may suggest another PDB value as an alternative to the $5GPDB_{requested}$. As shown in block 302B of FIG. 3B, for example, the UPF entity 125 may calculate the smallest latency that can be provided by any available LGS slice instance(s) to which the UE 105 subscribes. The UPF entity 125 may then attach this value as a suggested PDB in a rejection response to the source node 330, as shown in step 303B of FIG. 3B. That value can then be updated by each node in the DN 130 prior to reaching the node 330, as the Request-to-Send message can be updated. Alternatively, the suggestion can be made using another value, such as a difference between the originally-requested PDB and the 5GC's allowable PDB. In turn, the source node 330 in the DN 130 may use the suggested PDB to adjust the latency guarantee requirement and begin a new round of a Request-to-Send procedure between the source node 330 and the UPF entity 125, as shown in block 304B of FIG. 3B.

LGS Slice Instance Selection

Before a UE 105 can access an LGS slice, the UE 105 registers itself with a network via a registration procedure. Multiple or all LGS slices may be registered by the UE 105 for latency guaranteed service. For discussion purposes, assume that the UE 105 is subscribed to such a latency guarantee service. The UE's subscription information can be retrieved from a repository stored in the network or from a network element configured to store such information, such as the UDM entity 145 in FIG. 1.

Figure 4:
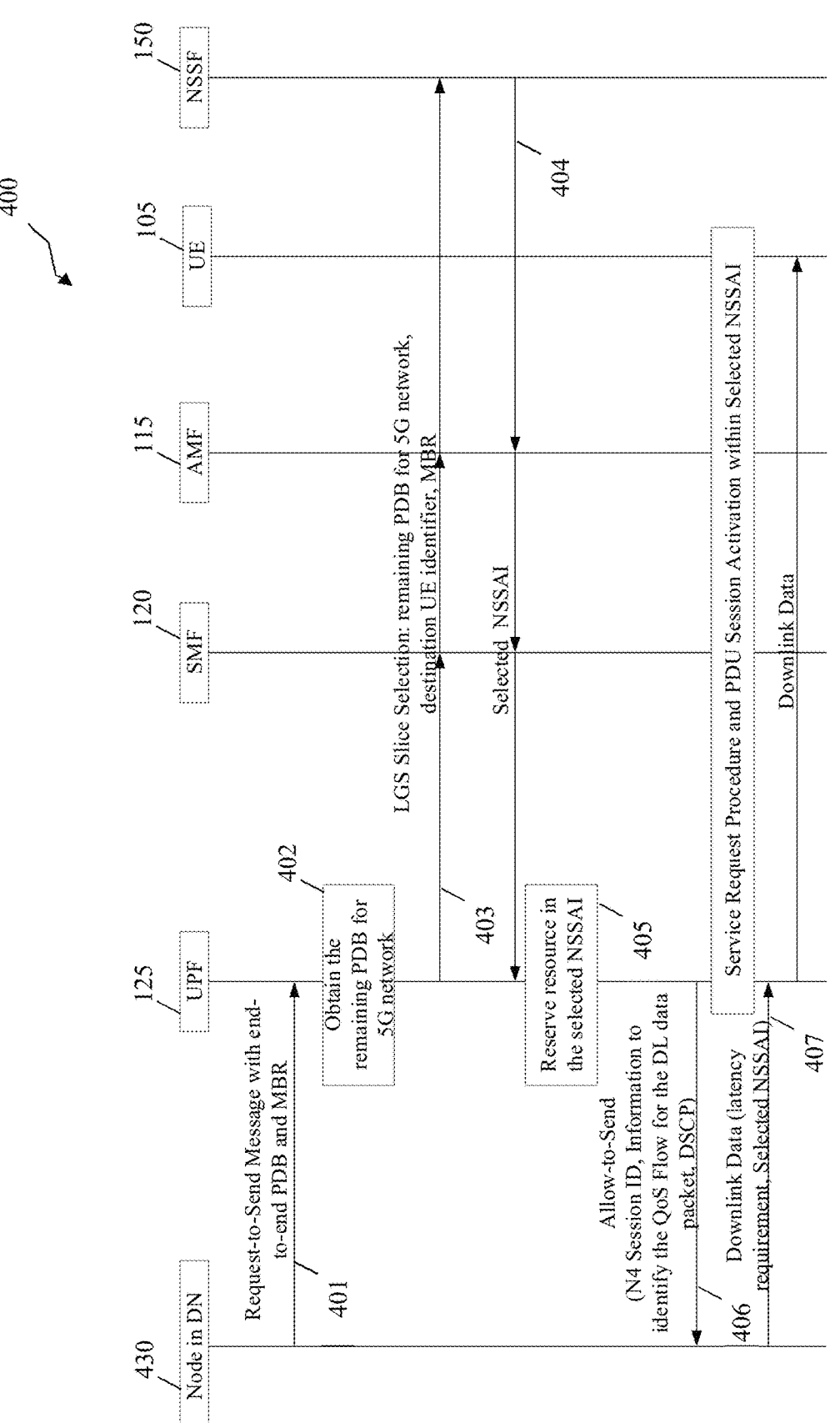
FIG. 4 is a diagram of an LGS slice selection procedure according to an embodiment of the disclosure.

FIG. 4 is a diagram of an LGS slice selection procedure 400 according to an embodiment of the disclosure. Note that in this embodiment, a network element such as an AMF entity 115 or an NSSF entity 150 may be configured to perform LGS slice selection in the LGS slice selection procedure 400 of FIG. 4. For discussion purposes, we will assume that the NSSF entity 150 is responsible for performing LGS slice selection for downlink or uplink traffic, although other entities are also possible, such as the AMF entity 115.

At step 401, a source node 430 in the DN 130 transmits a Request-to-Send to the UPF entity 125. As previously discussed, the Request-to-Send may contain a latency guarantee service indicator, an end-to-end PDB requirement (e.g., $E2EPDB_{requested}$), a maximum flow rate (e.g., MBR), and/or a destination UE default IP address. It should be understood that in existing implementations, a UPF does not have access to control plane messages. As such, an appropriate mechanism may be added such that the UPF entity 125 is able to read the Request-to-Send message and process information conveyed therein.

Embodiments of the present disclosure may employ an evolving data communication protocol known as "New IP," which is designed to extend packet networking with new capabilities to support future applications that go beyond the capabilities provided by current internetworking protocols. New IP is designed to allow users to specify requirements such as key performance indicators (KPIs) and other metrics for packet processing purposes. To this end, for example, packets may be embedded with conditional directives (sometimes referred to as "contracts") to be enforced by one or more intermediary network elements.

In an embodiment, New IP may be used as the unified framework for the data plane, in which case the UPF entity 125 may treat the Request-to-Send as a data plane message initiated by the source node 430 in the DN 130 for downlink data. As such, information to be conveyed to the UPF entity 125 may be provided via a contract (e.g., metadata) within the Request-to-Send. In other words, this concept of a contract may be used to allow clients/users to specify their requirements in terms of latency, reliability, throughput, etc. Thus, the Request-to-Send may comprise a contract such as a New IP packet header containing additional guidance for intermediate nodes (e.g., routers) along a path for how the packet should be processed. For example, the contract may contain a service level agreement (SLA) to provide end-to-end latency for packet level service guarantees, e.g., in-time guarantee and on-time guarantee.

When the UPF entity 125 receives the Request-to-Send with the latency guarantee requirement from the source node 430, the UPF entity 125 may obtain the remaining latency budget for the 5G network, as shown in block 402. When New IP is used as the unified framework for the data plane, packets containing a contract field may be used to specify one or more actions and/or conditions. For example, the Request-to-Send may comprise a contract clause including an action/condition such as a "LatencyGurantee" specifying the required bounded latency, i.e., the end-to-end PDB. The remaining PDB is reduced while the Request-to-Send message traverses the DN 130, i.e., the PDB is reduced at every hop in which latency is incurred. Once the UPF entity 125 receives the Request-to-Send request, the UPF entity 125 can extract the remaining PDB for the 5G network from the New IP contract clause (e.g., metadata).

At step 403, an LGS slice selection request message may be forwarded from the UPF entity 125 through the SMF entity 120, the AMF entity 115 and finally to the NSSF entity 150 for LGS slice selection. The LGS slice selection request may comprise the remaining PDB for the 5G network, the MBR, and a destination identifier of the UE 105. Each LGS slice (e.g., slice 220) that the destination UE 105 subscribes to and establishes a PDU session in is associated with a maximum latency value that may be incurred in the 5G network. By comparing the maximum latency value with the remaining PDB included in the LGS slice selection request received in step 403, the NSSF entity 150 can select an appropriate LGS slice that generates a latency in the 5G network that is smaller than the remaining PDB and can accommodate the MBR of the upcoming downlink flow. That is, in the selected LGS slice, for an intermediate router with an ingress rate denoted as $R_{ingress}$ and an egress rate denoted as $R_{egress}$, the MBR needs to satisfy the following conditions:

$$MBR \le R_{ingress} - \sum_{i=1}^{n} MBR_i^{LGS}$$

$$MBR \le R_{egress} - \sum_{i=1}^{n} MBR_i^{LGS}$$

where $$\sum_{i=1}^{n} MBR_i^{LGS}$$

is the total MBR of already admitted n number of LGS flows in the selected LGS slice.

When there are multiple LGS slices that satisfy the above criteria, the NSSF entity 150 may select an LGS slice deemed to yield the smallest end-to-end latency in the 5G network. At step 404, the NSSF entity 150 may return Network Slice Selection Assistance Information (NSSAI) that corresponds to the selected LGS slice. In an embodiment, the selected LGS slice may be configured only for a latency guaranteed service, where only flows towards (i.e., destined to) UEs or initiated by UEs subscribing to the latency guaranteed service are admissible to the selected LGS slice. Further, all flows admitted to the in the selected LGS have a same priority as one another, and thus, all such flows need not compete with one another for resources.

After the UPF entity 125 receives the selected NSSAI from the NSSF entity 150 via the AMF entity 115 and SMF entity 120, the UPF entity 125 may perform resource reservation as shown in block 405. For example, the UPF entity 125 may reserve the appropriate resources (e.g., intermediate routers) in one or more of the 5G core network, Transport network, and the 5G-RAN to accommodate the upcoming downlink traffic. It should be noted that a network element such as a service provider may provision or assign resource for an LGS slice. For example, an available ingress rate and egress rate of each intermediate router (e.g., routers between the source node 430 and UE 105) may be managed to yield a pre-determined upper bound of latency capable of being generated in the LGS slice.

At step 406, the UPF entity 125 may send an Allow-to-Send to the source node 430 in the DN 130, where the Allow-to-Send may comprise various information associated with the downlink traffic. For example, the Allow-to-Send may contain a field in which the QoS of the flow is set to "Latency Guarantee," which may be assigned a new 5G QoS indicator (5QI) to identify the downlink QoS flow. The Allow-to-Send may also contain identifiers such as an N4 session identifier associated with the downlink QoS flow, as well as a new differentiated services code point (DSCP) identifier, which may be allocated for "Latency Guarantee" in the 5G core network and in the DN 130.

A PDU session needs to be established or activated for the upcoming traffic flow. When a PDU session for the destination UE 105 in the selected LGS slice has previously been established but is currently deactivated, the service request procedure may be carried out immediately after the UPF entity 125 is acknowledged with the selected LGS slice information from the NSSF entity 150 (i.e., instead of waiting for the first downlink packet arrival to trigger the service request procedure). This way, there is no delay for the service request procedure after the first downlink packet arrival, meaning that the transmission of downlink data towards the destination UE 105 could happen right away in step 407, thereby further ensuring latency guarantee performance.

When none of the LGS slices that the UE 105 subscribes to can satisfy the criteria listed above in step 403, the NSSF entity 150 may reject the Request-to-Send. Yet as previously discussed with respect to FIG. 3B, the NSSF entity 150 may first calculate a suggested end-to-end PDB in the 5G network based on the currently available LGS slices and their maximum end-to-end latency characteristics. In such case, the NSSF 150 may send the UPF entity 125 a rejection response containing the suggested PDB.

Service Request and PDU Session Establishment/Activation in LGS Slice Instance

When the UE 105 is in a connection management (CM)-IDLE state or in a CM-CONNECTED state in 3GPP access, the network initiates a network triggered service request procedure right after the UPF entity 125 obtains confirmation from the NSSF entity 150 that the Request-to-Send is allowed with a selected LGS slice instance (i.e., selected NSSAI is returned to the UPF entity 125 from the NSSF entity 150). In order to avoid the latency that may be incurred by the service request procedure, the service request procedure and PDU session establishment/activation may be carried out before the first downlink packet arrives. Since the Allow-to-Send is returned to the source node 430 in the DN 130, downlink data is expected to quickly arrive in the UPF entity 125.

When the UE 105 is in the CM-IDLE state and asynchronous type communication is not activated, the network may send a paging request to the (R)AN/UE. The paging request is configured to trigger a UE-Triggered Service Request procedure in the UE 105.

The UE 105 sends a 5G Session Management (5GSM) NAS PDU Session Establishment message (not shown) to the AMF entity 115. This message may include various parameters such as a PDU session identifier (ID), selected NSSAI (e.g., the source node in the DN 130 will request this NSSAI for the downlink data), a PDU session type, etc. When the PDU Session Establishment is a request to establish a new PDU session, the Session Establishment message may also include a Request Type field or an information element indicating "Initial Request."

In turn, the AMF entity 115 forwards the 5GSM container (containing the PDU Session Establishment message) to the SMF entity 120. The SMF entity 120 may then retrieve (e.g., from the UDM entity 145) Session Management subscription data related to the UE 105. It is assumed that the UE 105 subscribes to the latency guarantee service as a recipient, and is therefore eligible to use the selected LGS slice instance in the 5G infrastructure.

Figure 5:
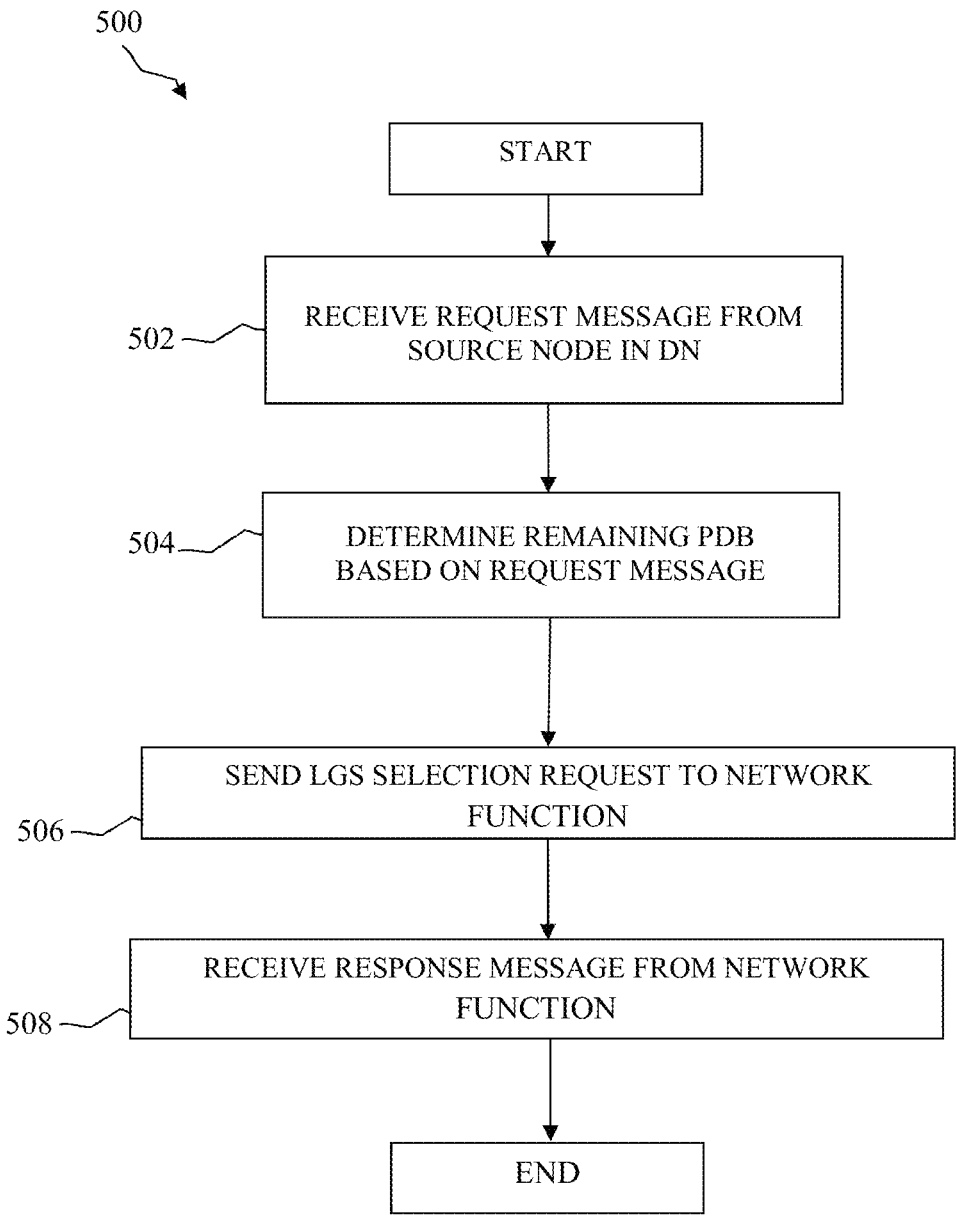
FIG. 5 is a flowchart for selecting an LGS slice according to an embodiment of the disclosure.

FIG. 5 is a flowchart of a method 500 of performing LGS slice selection according to an embodiment of the disclosure. The operations in the method 500 may be performed in the order shown, or in a different order. Further, two or more of the operations of the method 500 may be performed concurrently instead of sequentially.

At block 502, the method 500 comprises receiving, by a network device in a core network (e.g., a 5GC network), a request message from a source node in a DN (e.g., DN 130), where the request message request to transmit traffic to an end device (e.g., UE 105). As previously discussed, the request message may comprise an LGS indicator, an end-to-end (E2E) PDB requirement (e.g., $E2EPDB_{requested}$), a maximum flow rate (e.g., MBR), and an identifier of the end device (e.g., a default destination IP address).

At block 504, the method 500 comprises determining, by the network device based on the request message, a remaining PDB for the core network and a transport network. At block 506, the method 500 comprises sending, by the network device based on the LGS indicator, an LGS slice selection request to a network function (e.g., AMF 115 or NSSF 150), where the LGS slice selection request includes the remaining PDB, the maximum flow rate, and the identifier. At block 508, the method 500 comprises receiving, by the network device, a response message from the network function. In an embodiment, the response message comprises network slice selection assistance information (NS-SAI), where the NSSAI identifies an LGS slice to which the end device subscribes. In some aspects, the NSSAI may explicitly indicate whether the LGS slice is able to satisfy the remaining PDB and the maximum flow rate. In other aspects, the presence of the NSSAI may implicitly indicate that the LGS slice is able to satisfy the remaining PDB and the maximum flow rate.

Figure 6:
FIG. 6 is a diagram of a network device according to an embodiment of the disclosure.
Figure 6:
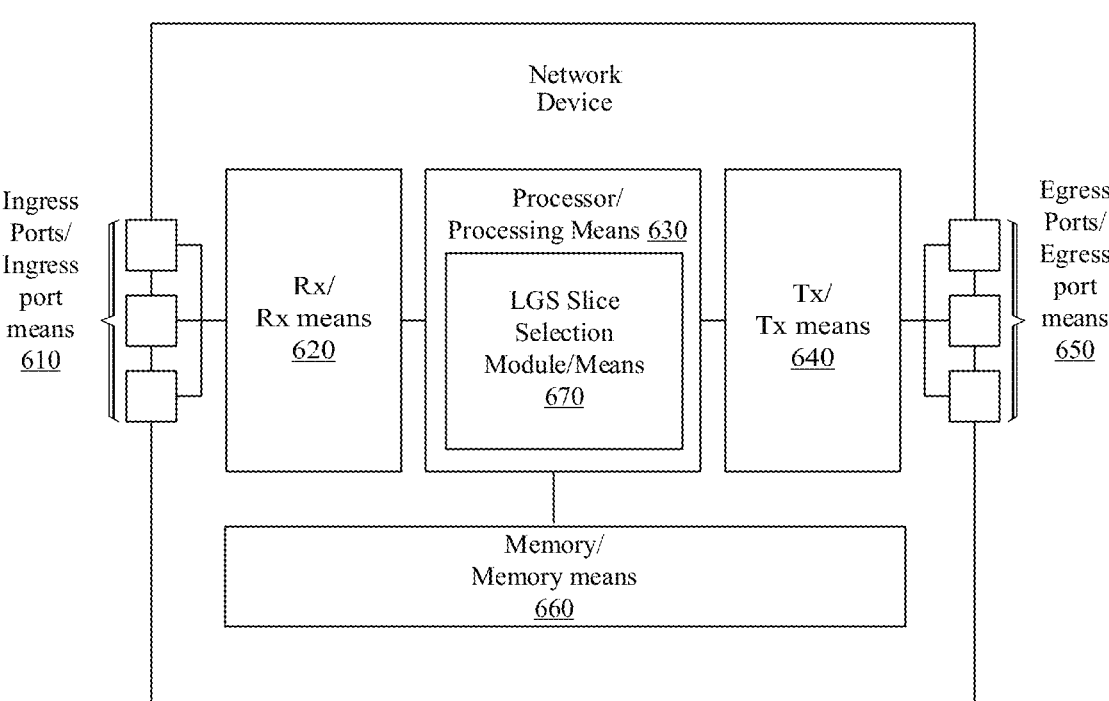

FIG. 6 is a diagram of a network device 600 according to an embodiment of the disclosure. The network device 600 is suitable for implementing the disclosed embodiments as described herein. The network device 600 comprises ingress ports/ingress means 610 and receiver units (Rx)/receiving means 620 for receiving data; a processor, logic unit, or central processing unit (CPU)/processing means 630 to process the data; transmitter units (Tx)/transmitting means 640 and egress ports/egress means 650 for transmitting the data; and a memory/memory means 660 for storing the data. The network device 600 may also comprise optical-to-electrical (OE) components and electrical-to-optical (EO) components coupled to the ingress ports/ingress means 610, the receiver units/receiving means 620, the transmitter units/transmitting means 640, and the egress ports/egress means 650 for egress or ingress of optical or electrical signals.

The processor/processing means 630 is implemented by hardware and software. The processor/processing means 630 may be implemented as one or more CPU chips, cores (e.g., as a multi-core processor), field-programmable gate arrays (FPGAs), application specific integrated circuits (ASICs), or digital signal processors (DSPs). The processor/processing means 630 is in communication with some or all of the ingress ports/ingress means 610, receiver units/receiving means 620, transmitter units/transmitting means 640, egress ports/egress means 650, and/or memory/memory means 660. The processor/processing means 630 in the embodiment shown includes instructions such as an LGS slice selection module/means 670. The LGS slice selection module/means 670 is able to implement the methods disclosed herein. The inclusion of the LGS slice selection module/means 670 therefore provides a substantial improvement to the functionality of the network device 600 and effects a transformation of the network device 600 to a different state. Alternatively, the LGS slice selection module/means 670 is implemented as instructions stored in the memory/memory means 660 and executed by the processor/processing means 630.

The memory/memory means 660 comprises one or more disks, tape drives, and solid-state drives and may be used as an over-flow data storage device, to store programs when such programs are selected for execution, and to store instructions and data that are read during program execution. The memory/memory means 660 may be volatile and/or non-volatile and may be read-only memory (ROM), random access memory (RAM), ternary content-addressable memory (TCAM), and/or static random-access memory (SRAM).

Embodiments of the present disclosure may be applied worldwide to the "New IP" data communication protocol that extends packet networking with new capabilities to support future applications that go beyond the capabilities provided by current internetworking protocols. Additionally, the techniques disclosed herein may be applied to a wide range of use cases, such as industrial machine-type communications, holographic type communications, IP mobile backhaul transport for URLLC and mMTC, autonomous vehicles, telehealth, industrial automation, cloud-based gaming, extended reality (XR), etc.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for end-to-end latency guarantees, the method comprising:

receiving, by a network device in a core network, a latency guarantee service (LGS) request message from a source node in a data network (DN), the LGS request message requesting to transmit traffic to an end device, the LGS request message comprising an end-to-end packet delay budget (PDB) requirement, a maximum flow rate, and an identifier of the end device;

determining, by the network device, based on the LGS request message, a remaining PDB for the core network and a transport network;

sending, by the network device, based on the LGS request message, an LGS slice selection request to a network function, the LGS slice selection request including the remaining PDB, the maximum flow rate, and the identifier; and receiving, by the network device, an LGS response from the network function, the LGS response identifying an LGS slice able to satisfy the remaining PDB and the maximum flow rate for the traffic.

2. The method of claim 1, wherein determining the remaining PDB comprises one or more of:

extracting metadata embedded in the LGS request message, the metadata comprising information regarding the remaining PDB, the network device determining the remaining PDB based on the metadata; or subtracting a PDB of the DN from the end-to-end PDB requirement to obtain the remaining PDB for the core network.

3. The method of claim 1, wherein the network device comprises a user plane function (UPF) entity, wherein the core network comprises a $5^{th}$ generation (5G) core (5GC) network, and wherein the network function comprises an access and mobility management function (AMF) or a network slice selection function (NSSF).

4. The method of claim 1, further comprising:

reserving, by the network device, resources in the LGS slice when the LGS response comprises network slice selection assistance information (NSSAI), wherein receiving the NSSAI indicates that the LGS slice is able to satisfy the remaining PDB and the maximum flow rate; and sending, by the network device, a response message to the source node based on the NSSAI, the response message indicating that the LGS request message to transmit traffic is accepted.

5. The method of claim 4, further comprising conducting, by the network device when a session for the end device has been previously established, a service request procedure immediately after sending the response message when the end device is in a connection management (CM)-IDLE state or a CM-CONNECTED state.

6. The method of claim 1, the LGS request message further comprising an LGS indicator, the LGS indicator indicating that the source node requests an LGS for a downlink dataflow from the source node to the end device, the end-to-end PDB requirement denoting a total PDB of a $5^{th}$ generation (5G) radio access network (5G-RAN), the transport network, and the core network, the maximum flow rate comprising a maximum bit rate (MBR) of the downlink dataflow, and the identifier of the end device comprising a default Internet Protocol (IP) address associated with a protocol data unit (PDU) session that the end device establishes towards the DN.

7. The method of claim 1, wherein the LGS response comprises a suggested end-to-end PDB when the LGS slice is not able to satisfy the remaining PDB and the maximum flow rate, the suggested end-to-end PDB indicating a maximum end-to-end latency characteristic associated with the LGS slice.

8. The method of claim 1, wherein the LGS slice is limited to an LGS, wherein only flows destined to end devices or initiated by end devices subscribing to the LGS are admissible to the LGS, and wherein all flows admitted in the LGS do not compete with one another for resources.

9. A network device for achieving end-to-end latency guarantees, comprising:

a memory storing instructions; and at least one processor in communication with the memory, the at least one processor configured, upon execution of the instructions, to perform the following steps:

receive a latency guarantee service (LGS) request message from a source node in a data network (DN), the LGS request message requesting to transmit traffic to an end device, and the LGS request message comprising an end-to-end packet delay budget (PDB) requirement, a maximum flow rate, and an identifier of the end device;

determine, based on the LGS request message, a remaining PDB for a transport network and a core network, the network device being disposed in the core network;

send, based on the LGS request message, an LGS slice selection request to a network function, the LGS slice selection request including the remaining PDB, the maximum flow rate, and the identifier; and receive an LGS response from the network function, the LGS response identifying an LGS slice able to satisfy the remaining PDB and the maximum flow rate for the traffic.

10. The network device of claim 9, wherein the network device determines the remaining PDB by one or more of:

extracting metadata embedded in the LGS request message, the metadata comprising information regarding the remaining PDB, and the network device determining the remaining PDB based on the metadata; or subtracting a PDB of the DN from the end-to-end PDB requirement to obtain the remaining PDB for the core network.

11. The network device of claim 9, wherein the network device comprises a user plane function (UPF) entity, wherein the core network comprises a $5^{th}$ generation (5G) core (5GC) network, and wherein the network function comprises an access and mobility management function (AMF) or a network slice selection function (NSSF).

12. The network device of claim 9, wherein the at least one processor is configured to execute the instructions to further cause the network device to:

reserve resources in the LGS slice when the LGS response comprises network slice selection assistance information (NSSAI), wherein receiving the NSSAI indicates that the LGS slice is able to satisfy the remaining PDB and the maximum flow rate; and send a response message to the source node based on the NSSAI, the response message indicating that the LGS request message to transmit traffic is accepted.

13. The network device of claim 12, wherein the at least one processor is configured to execute the instructions to further cause the network device to:

conduct, when a session for the end device has been previously established, a service request procedure immediately after sending the response message when the end device is in a connection management (CM)-IDLE state or a CM-CONNECTED state.

14. The network device of claim 9, the LGS request message further comprising an LGS indicator, the LGS indicator indicating that the source node requests an LGS for a downlink dataflow from the source node to the end device, the end-to-end PDB requirement denoting a total PDB of a $5^{th}$ generation (5G) radio access network (5G-RAN), the transport network, and the core network, the maximum flow rate comprising a maximum bit rate (MBR) of the downlink dataflow, and the identifier of the end device comprising a default Internet Protocol (IP) address associated with a protocol data unit (PDU) session that the end device establishes towards the DN.

15. The network device of claim 9, wherein the LGS response comprises a suggested end-to-end PDB when the LGS slice is not able to satisfy the remaining PDB and the maximum flow rate, the suggested end-to-end PDB indicating a maximum end-to-end latency characteristic associated with the LGS slice.

16. The network device of claim 9, wherein the LGS slice is limited to an LGS, wherein only flows destined to end devices or initiated by end devices subscribing to the LGS are admissible to the LGS, and wherein all flows admitted in the LGS do not compete with one another for resources.

\* \* \* \* \*